（12） United States Patent
Brenner et al.

(10) Patent No.: US 10,578,424 B2
(45) Date of Patent: Mar. 3, 2020

(54) ROTATING/PIVOTING SENSOR SYSTEM FOR A COORDINATE MEASURING APPARATUS

(71) Applicant: Carl Zeiss Industrielle Messtechnik GmbH, Oberkochen (DE)

(72) Inventors: Kurt Brenner, Satteldorf (DE); Tobias Woletz, Essingen (DE); Anton Fuchs, Boehmenkirch (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 163 days.

(21) Appl. No.: 15/844,595

(22) Filed: Dec. 17, 2017

(65) Prior Publication Data
US 2018/0180402 A1 Jun. 28, 2018

(30) Foreign Application Priority Data
Dec. 22, 2016 (DE) .......................... 10 2016 226 087

(51) Int. Cl.
*G01B 5/008* (2006.01)
*G01B 11/00* (2006.01)
(Continued)

(52) U.S. Cl.
CPC ............ *G01B 11/005* (2013.01); *G01B 5/012* (2013.01); *G01B 7/001* (2013.01); *G01B 11/007* (2013.01);
(Continued)

(58) Field of Classification Search
CPC ...................................................... G01B 5/008
(Continued)

(56) References Cited

U.S. PATENT DOCUMENTS 5,189,806 A 3/1993 McMurtry et al.
5,724,745 A * 3/1998 Brenner ............. G05B 19/4207
33/1 M
(Continued)

FOREIGN PATENT DOCUMENTS

CN 1517667 A 8/2004
CN 102261900 A 11/2011
(Continued)

OTHER PUBLICATIONS

Office Action dated Sep. 4, 2019 issued in Chinese counterpart application No. 201711390141.9 and English-language translation thereof.

*Primary Examiner* — George B Bennett
(74) *Attorney, Agent, or Firm* — Falk Ewers; Ewers IP Law PLLC

(57) ABSTRACT

Rotating/pivoting sensor system for a coordinate measuring apparatus is provided. The rotating/pivoting sensor system includes a coupling mechanism with which the rotating/pivoting sensor system can be coupled to a measurement head of a coordinate measuring apparatus, a sensor-holding part which is connected directly or indirectly to the coupling mechanism, a sensor which is mounted rotatably about a first rotation axis on the sensor-holding part and which is pivotable about the first rotation axis in a continuous angle range, an angle-measuring system with which a pivoting angle of the sensor can be determined, a fixing device with which the sensor can be fixed in a pivoting position, and a method for adjusting a rotating/pivoting sensor system in a coordinate measuring apparatus.

16 Claims, 3 Drawing Sheets

(51) Int. Cl.
*G01B 21/04* (2006.01)
*G01B 11/25* (2006.01)
*G01B 11/02* (2006.01)
*G01B 5/012* (2006.01)
*G01B 7/00* (2006.01)

(52) U.S. Cl.
CPC .......... *G01B 11/02* (2013.01); *G01B 11/2504* (2013.01); *G01B 21/047* (2013.01)

(58) Field of Classification Search
USPC .......................................................... 33/503
See application file for complete search history.

(56) References Cited

U.S. PATENT DOCUMENTS

| | | | | |
|---|---|---|---|---|
| 5,829,148 A | * | 11/1998 | Eaton | G01B 5/008 |
| | | | | 33/503 |
| 7,036,239 B2 | | 5/2006 | Jordil et al. | |
| 8,479,403 B2 | | 7/2013 | Jordil et al. | |
| 9,494,403 B2 | | 11/2016 | Rouge et al. | |
| 2011/0173829 A1 | * | 7/2011 | Pettersson | B25H 1/0021 |
| | | | | 33/503 |
| 2013/0019488 A1 | * | 1/2013 | McMurtry | G01B 5/012 |
| | | | | 33/503 |
| 2014/0053423 A1 | * | 2/2014 | Brenner | G01B 5/012 |
| | | | | 33/503 |
| 2014/0298668 A1 | * | 10/2014 | Huang | G01B 5/012 |
| | | | | 33/645 |
| 2015/0158136 A1 | | 6/2015 | De La Maza Uriarte | |
| 2016/0153767 A1 | * | 6/2016 | Ihlenfeldt | G01B 11/005 |
| | | | | 33/503 |
| 2018/0023936 A1 | * | 1/2018 | Arai | G01B 5/0007 |
| | | | | 33/503 |
| 2018/0245905 A1 | * | 8/2018 | Brenner | G01B 5/28 |

FOREIGN PATENT DOCUMENTS

| | | |
|---|---|---|
| CN | 104729438 A | 6/2015 |
| DE | 102005063242 A1 | 6/2007 |
| DE | 202008013988 U1 | 12/2008 |
| DE | 102009048581 B3 | 6/2011 |
| DE | 102016201466 B3 | 4/2017 |
| EP | 2977715 A1 | 1/2016 |
| GB | 2298488 A | 9/1996 |
| WO | 2005028996 A1 | 3/2005 |

* cited by examiner

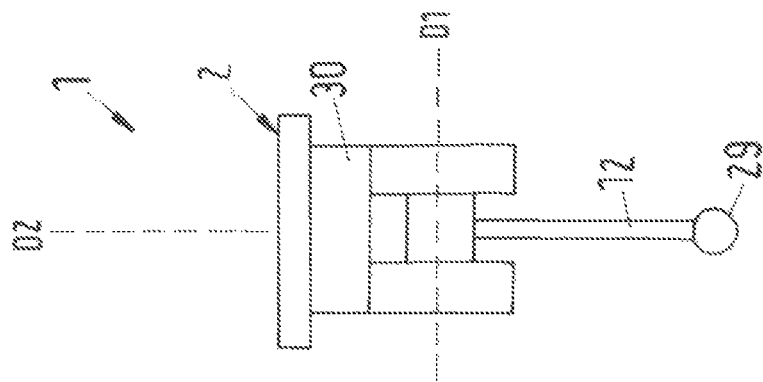
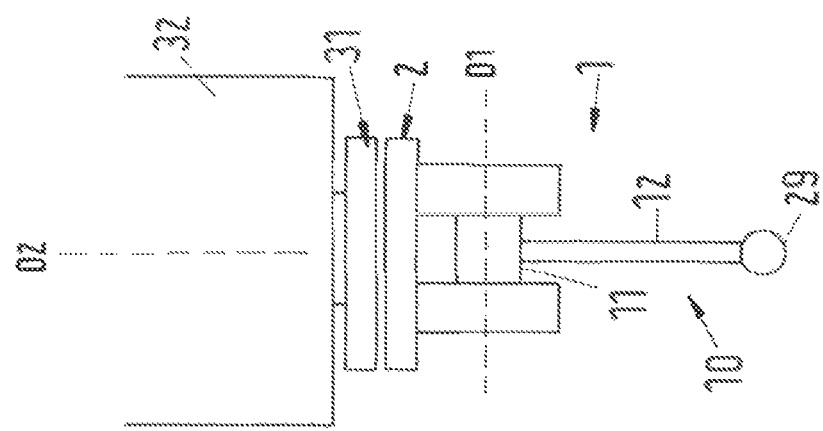
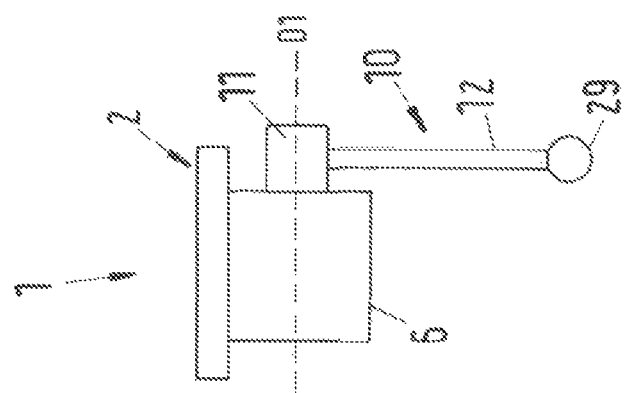
FIG. 2C
FIG. 2B
FIG. 2A

ROTATING/PIVOTING SENSOR SYSTEM FOR A COORDINATE MEASURING APPARATUS

CROSS REFERENCE TO RELATED APPLICATIONS

This application claims priority to German patent application DE 10 2016 226 087.1, filed Dec. 22, 2016, the entire content of which is incorporated herein by reference.

TECHNICAL FIELD

The present invention relates to a rotating/pivoting sensor system for a coordinate measuring apparatus and to a method for adjusting a rotating/pivoting sensor system in a coordinate measuring apparatus.

BACKGROUND

Coordinate measuring machines (CMMs) are used to measure component parts. Different sensor systems are used depending on the particular application. Together with a measurement head, e.g., with a measurement head of the VAST® family from Zeiss, a sensor system forms a measurement head system. A sensor system can be based on tactile or optical sensors and can operate by contact or contactlessly. As an example of a tactile, contact-based sensor system, stylus configurations are used for example. These stylus configurations can be actively changed during a measuring process. The stylus configurations are kept in a special magazine location.

The various stylus configurations are coupled to the measurement head by a change-over interface, which is standardized. Each probe sphere present on the stylus configuration must be calibrated once. After the calibration, the stylus configuration can be changed as often as desired, without renewed calibration.

In the case of large and complicated workpieces, for example an engine block and a cylinder head, with many features to be measured, many stylus configurations are needed for the complete measurement. A stylus configuration has, for example, a plurality of probes (having a shaft and, for example, a probe sphere) which are oriented in different directions. The space required for storing various stylus configurations is often a limiting factor, besides the costs. In the measurement of complicated workpieces, there are features that must be measured with a high degree of precision and some that must be measured with less precision.

For the features that must be measured with less precision, it is generally possible to use rotating/pivoting measurement head systems, e.g., a lockable rotating/pivoting unit RDS® from Zeiss, which allows the stylus to rotate about two axes in discrete 2.5° steps. The number of stylus configurations needed can thus be greatly reduced. A disadvantage is that such systems provide less precision. For example, this precision is often not sufficient when measuring an engine block and a cylinder head. Moreover, if small inclined bores with a certain depth must be measured, the discrete steps in the angle adjustment are problematic. This then leads to undefined probing in the bores and, consequently, to an incorrect measurement.

SUMMARY

It is an object of the invention to overcome the above-mentioned problem.

The problem is solved by a rotating/pivoting sensor system and by a method for adjusting a rotating/pivoting sensor system.

A rotating/pivoting sensor system for a coordinate measuring apparatus includes a coupling mechanism with which the rotating/pivoting sensor system can be coupled to a measurement head of a coordinate measuring apparatus, a sensor-holding part which is connected directly or indirectly to the coupling mechanism, a sensor which is mounted rotatably about a first rotation axis on the sensor-holding part and which is pivotable about this first rotation axis in a continuous angle range, an angle-measuring system with which a pivoting angle of the sensor can be determined, and a fixing device with which the sensor can be fixed in a pivoting position.

The rotating/pivoting sensor system can also be designated simply as a sensor system.

According to an aspect of the invention, an adjustable sensor is made available which can be rotated continuously about an axis or a plurality of axes (preferably two). This sensor can be coupled like a fixed sensor configuration, for example a stylus configuration, to a measurement head. A combination of a rotating/pivoting sensor system and of a measurement head is also designated as a rotating/pivoting measurement head system.

According to an aspect of the invention, a high degree of precision of a system with a fixed sensor configuration is achieved having the flexibility of an adjustable sensor configuration.

There is no need to replace a fixed sensor configuration with a rotating/pivoting unit in order to achieve greater flexibility.

The rotating/pivoting sensor system according to an aspect of the invention does not require its own sensors for the coordinate measurement, since it is the sensors of the measurement head that can be used. Known measurement heads according to the related art can be used, e.g., VAST® from Zeiss. Before a measurement, all that needs to be done is to determine the angle positions of rotation axes and pivot axes.

According to a further aspect of the invention, existing measurement methods of an active measurement head can be used if the rotating/pivoting sensor system is coupled to such a measurement head.

The coupling mechanism has, for example, an interface which matches an interface on a measurement head.

The rotating/pivoting sensor system can have a second rotation axis about which parts of the rotating/pivoting sensor system are rotatable relative to each other. A stated first rotation axis and a second rotation axis can preferably be perpendicular to each other. The second rotation axis is, for example, a rotation axis oriented in the Z direction of a Cartesian coordinate system. According to another aspect of the invention, a second rotation axis is formed where the sensor system is coupled to a measurement head. The sensor system as a whole is rotatable relative to the measurement head.

The sensor-holding part and the coupling mechanism are preferably connected rigidly to each other. An indirect connection can be provided via intermediate elements. In other words, the coupling mechanism is secured directly or indirectly on the sensor-holding part.

The sensor is mounted on the sensor-holding part by a rotary joint so as to be rotatable about said first rotation axis. A contact-based sensor or a contactless sensor can be used as the sensor. A tactile (touching) sensor or optical sensor can be used. A tactile sensor has a shaft and a probe element. A particularly advantageous optical sensor is a confocal white-light sensor.

The sensor is preferably an elongate sensor, in particular with a length-to-diameter ratio of greater than 3:1.

The angle-measuring system can be an angle-measuring system that measures in absolute values or in increments. The angle-measuring system can be referred to any desired zero point. For example, a zero setting is defined on an axis that is parallel to the Z axis of a Cartesian coordinate system. In other words, in the case of a tactile sensor with a shaft, the angle zero setting can be set when the shaft is oriented vertically in the Z direction. Pivoting angles in one or another direction can be preceded by a positive or negative sign. However, the angle zero point can also be set to any other desired position.

The fixing device can have a first fixing part and a second fixing part, which can be fixed relative to each other by actuation of a fixing mechanism. The first fixing part can be connected rigidly to the sensor, while the second fixing part can be connected securely (i.e., immovably) to the sensor-holding part. The first part of the fixing device and the second part of the fixing device are preferably pressed against each other. For this purpose, the fixing device can have a suitable pressing mechanism.

In one exemplary embodiment of the invention, the fixing device provides a force-fit connection in the fixing state. In other words, the fixing device is designed to produce a force-fit connection in the fixing state. The released state is different from the fixing state. In particular, the fixing device has friction surfaces which are pressable against each other in the fixing state. Friction surfaces are, in other words, surfaces between which a static friction arises when they are pressed against each other. A first friction surface can be provided on a first part of the fixing device, and a second friction surface can be provided on a second part of the fixing device.

In a further exemplary embodiment, the fixing device produces a form-fit connection in the fixing state. This exemplary embodiment can be combined with an aforementioned exemplary embodiment having a force-fit connection. In other words, the fixing device is designed to produce a form-fit connection in the fixing state. In particular, the fixing device can have a toothed arrangement with teeth meshing in one another. A stated first part of the fixing device can have a form feature in the shape of teeth, and a second part of the fixing device can likewise have a form feature in the shape of teeth. Both form features complement each other, such that the stated teeth mesh in each other and provide a form-fit connection in the fixing state.

In one exemplary embodiment, the rotating/pivoting sensor system has a motor with which the fixing device can be brought to the fixing state or, conversely, can be released. A drive can likewise be present. The motor can drive a stated fixing mechanism. This embodiment is particularly suitable for a mechanically activatable fixing device.

The fixing device can be designed as a mechanical, electrical, magnetic or electromagnetic brake.

In one exemplary embodiment, the fixing device has a magnetically acting brake, in particular an electromagnetically acting brake.

As has been mentioned, the sensor is mounted rotatably on the sensor-holding part. A high-precision bearing is provided. In one exemplary embodiment of the invention, a roller bearing is used.

Methods are explained below in which an above-described rotating/pivoting sensor system can be used.

According to an aspect of the invention, a method for adjusting a rotating/pivoting sensor system in a coordinate measuring apparatus is provided. The method includes:
 a) coupling a rotating/pivoting sensor system as described herein to a measurement head of the coordinate measuring apparatus,
 b) pivoting the sensor to a pivoting position, and
 c) actuating the fixing device to the fixing state, and fixing the sensor in the pivoting position.

The measurement head of the coordinate measuring apparatus can be a measuring measurement head or a switching measurement head. A measuring measurement head or a measuring measurement system are preferred.

The pivoting of the sensor to a pivoting position is preferably performed such that the adopted pivoting position matches a set measurement task. The above steps b) and c) can be repeated as often as desired to adopt different pivoting positions. The steps b) and c) can be followed by the step of coordinate measurement on a workpiece. If another pivoting position is to be adopted, the fixing device can be released, i.e., brought to the released state, after which a modified pivoting position can be adopted (step b) or also designated as b') on account of a modified pivoting position). Thereafter, step c) can take place, i.e., the fixing device can be brought to the fixing state to carry out further measurements with the modified pivoting position. These steps can be carried out as often as desired, depending on the number of required pivoting positions.

In an exemplary embodiment of the method, the method includes:
 determining an actual pivoting angle with the angle-measuring system before and after the actuation of the fixing device,
 comparing the actual pivoting angle with a desired pivoting angle,
 correcting the actual pivoting angle if the comparing reveals a deviation of the actual pivoting angle from the desired pivoting angle, in which correction the deviation is eliminated or substantially eliminated by changing the actual pivoting angle.

According to this aspect of the invention, it is possible to make use of the possibility of continuous angle adjustment in the sensor system.

When the actual pivoting angle is determined after the actuation of the fixing device and a correction of the actual pivoting angle is to be made, the fixing device must be released to modify, by pivoting, the actual pivoting angle. Therefore, in the stated third step, the method optionally includes, before modification of the actual pivoting angle, the release of the fixing device if the latter has been actuated before.

According to a further aspect of the invention, the method includes:
 determining an actual pivoting angle with the angle-measuring system after the actuation of the fixing device,
 comparing the actual pivoting angle with a desired pivoting angle, and
 determining an arithmetic correction value if the comparing reveals a deviation of the actual pivoting angle from the desired pivoting angle.

This method is used if slight deviations between the actual pivoting angle and the desired pivoting angle remain after the fixing device has been actuated, i.e., has been brought to the fixing state. In the case of greater deviations, it is preferable to proceed as above, i.e., to correct the deviation by actual modification of the actual pivoting angle. However, in this method involving actual correction by movement after the renewed fixing, stated minimal residual deviations often remain, which are preferably arithmetically corrected.

Through actuation of the fixing device and application of a fixing force, an angle deviation from the desired angle may be caused, but this deviation is generally only very slight. The desired angle can be taken as a basis for measurement tasks. A real deviation between the actual angle and the desired angle after fixing can be corrected arithmetically. The arithmetic correction value is used for this purpose. A method, which can also be designated as measurement method, includes specifically:

performing a coordinate measurement on a workpiece, and correcting measurement results from the coordinate measurement using the arithmetic correction value.

Alternatively, the actual angle, which is obtained after the fixing and which is fixable, can be used as a basis for the measurement.

Generally, a pivoting angle of the sensor can be determined by the stated angle-measuring system, for example an angle of a stylus or of a probe shaft in a tactile sensor. The position of a probe element, for example of a probe sphere, can be determined by a separate calibration procedure, for example with a calibration sphere.

According to an aspect of the invention, a motor for controlling the fixing device is controlled by an electronic bus system. The angle-measuring system can likewise communicate or be read out via a bus system.

According to yet another aspect of the invention, the bus system is deactivated when the fixing device is brought to the fixing state, in particular when the fixing device is brought to the fixing state after a correction of the actual pivoting angle. The deactivation of the bus system is very particularly advantageous when coordinates are measured on a workpiece. Through the deactivation of the bus system, heating is minimized, or further heating is prevented, which improves the precision of the measurement results.

BRIEF DESCRIPTION OF THE DRAWINGS

The invention will now be described with reference to the drawings wherein:

FIG. 2A shows a floating arrangement of a rotation axis and add-ons of the rotating/pivoting sensor system;

FIG. 2B shows a central arrangement with two rotation axes and add-ons of the rotating/pivoting sensor system;

FIG. 2C shows another arrangement with two rotation axes and add-ons of the rotating/pivoting sensor system.

DESCRIPTION OF EXEMPLARY EMBODIMENTS

Figure 1:
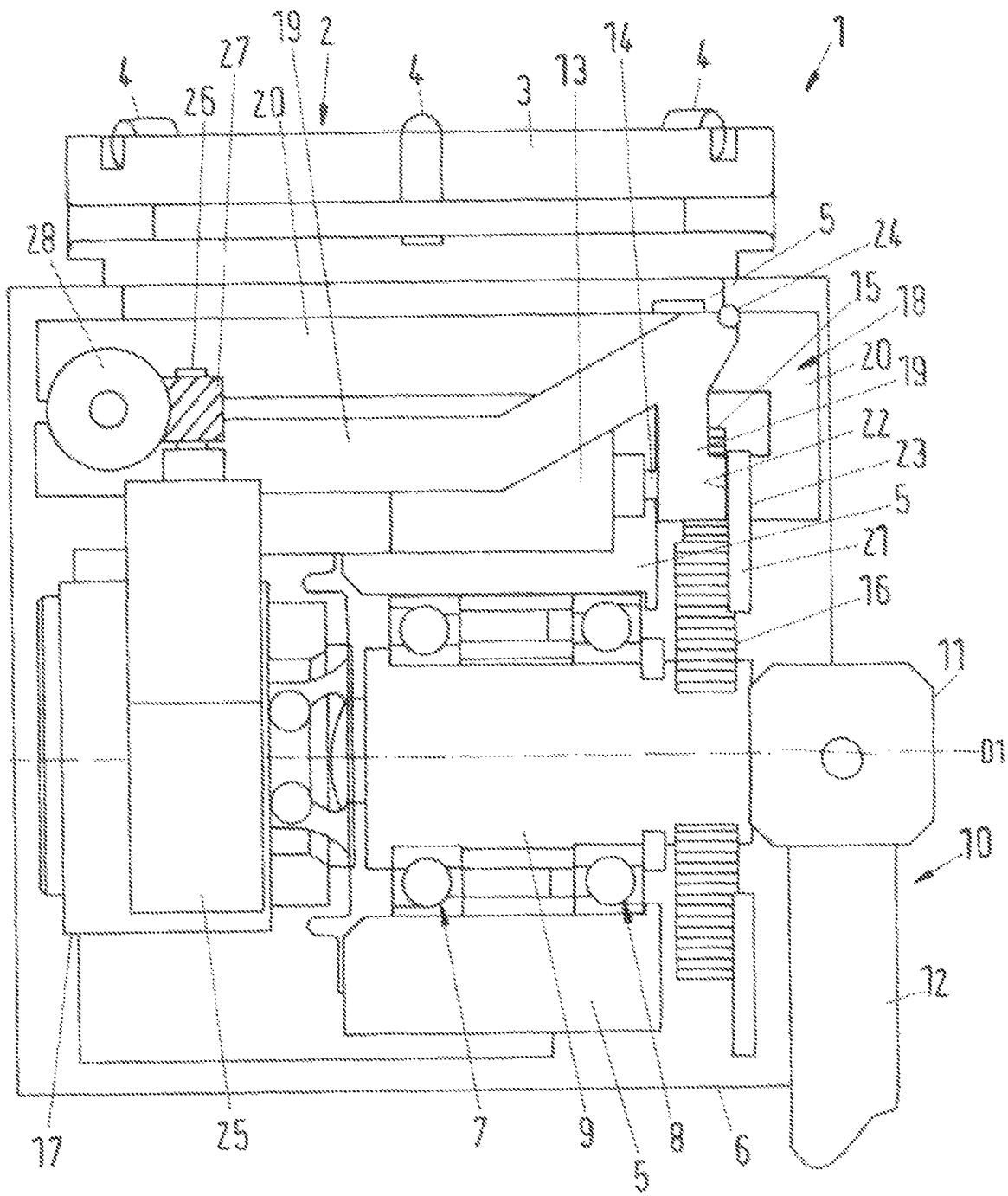
FIG. 1 shows a structure of a rotating/pivoting sensor system according to an exemplary embodiment of the invention.

The rotating/pivoting sensor system 1 shown in FIG. 1 has a coupling mechanism 2 in the form of a plate 3 with rollers 4 mounted thereon. With this coupling mechanism 2, the rotating/pivoting sensor system 1 can be coupled to a measurement head 32 (see FIG. 2B) of a coordinate measuring apparatus.

The sensor-holding part 5, which also constitutes a supporting structure of the sensor system 1, is connected to the coupling mechanism 2. The sensor-holding part 5 is surrounded by the housing 6.

An axle 9 of the sensor 10 is mounted rotatably about the rotation axis D1 in the sensor-holding part 5 via roller bearings 7, 8. The sensor 10 has a connection piece 11, which is secured on the axle 9, and a shaft 12 which protrudes at right angles from the axle and at whose end (not shown) for example, a probe element, in particular a probe sphere, can be secured. It is likewise possible that the sensor 10 is an optical sensor and that the part 12 is an elongate component of such an optical sensor and is pivotable about the rotation axis D1.

The axle 9 can be driven by the motor 13. The motor 13 has the motor axle 14 which is connected to the toothed wheel 15. The toothed wheel 15 meshes in a toothed wheel 16, which can be seen in the cross section in FIG. 1 and which is secured on the axle 9.

The angle-measuring system 17, which permits absolute measurement, and which is a contactless angle-measuring system, is arranged next to the axle 9 and in alignment with the rotation axis D1.

The rotating/pivoting sensor system 1 includes the fixing device 18. The fixing device 18 has levers 19, 20 and a disc 21, which is fixed on the toothed wheel 16 and which protrudes from the tooth wheel 16 radially with respect to the rotation axis D1. The disc 21 is likewise shown in the cross section and is ring-shaped. When the cheeks 22 and 23, which are formed on the levers 19, 20, are pressed against opposite sides of the disc 21, the fixing device 18 can be brought to the fixing state such that the sensor 10 is no longer rotatable about the rotation axis Dl. The levers 19, 20 are rotatable relative to each other about the rotation axis 24. A motor 25 is provided, the motor axle 26 of which is connected to the pinion 27, which in turn drives an eccentric toothed wheel 28. By the eccentric toothed wheel 28, the levers 19, 20 are driven apart on sides of the motor, i.e., leftwards from the rotation axis 24 in FIG. 1, such that the cheeks 22 and 23 press against the disc 21 and thus fix the sensor 10 in the momentary rotation position. In the case where the eccentric wheel 28 does not move the levers 19, 20 apart, i.e., does not exert a force on the levers, a restoring mechanism (not shown in any detail) is provided, for example a spring.

FIGS. 2A, 2B, and 2C show three different configurations of a rotating/pivoting joint, all of them designated by reference sign 1 in order to simplify matters. The structure depicted in FIG. 1 is shown in FIG. 2A, with the same reference signs indicating the same elements. This arrangement is also designated as the floating arrangement of a rotation axis. In contrast to FIG. 1, FIG. 2A also shows a probe sphere 29 provided at the end of the shaft 12. FIG. 2B shows a so-called central arrangement of the rotation axis or of the pivotable part including the intermediate piece 11, the shaft 12, and the probe sphere 29. In FIG. 2C, the rotating/pivoting sensor system has a first rotation axis D1, which is also shown in the preceding figures, and also a second rotation axis D2. An intermediate piece 30 is provided which is rotatable about the axis D2 relative to the coupling mechanism 2. Thus, the rotating/pivoting sensor system already has two rotation axes D1 and D2. By contrast, in the exemplary embodiments shown in FIGS. 2A and 2B, a rotary joint is provided on sides of the measurement head 32 on which the rotating/pivoting sensor system is coupled with the coupling mechanism 2. For example, a mating coupling mechanism 31, provided on the measurement head and cooperating with the coupling mechanism 2, can be rotatable relative to the measurement head 32.

Figure 3:
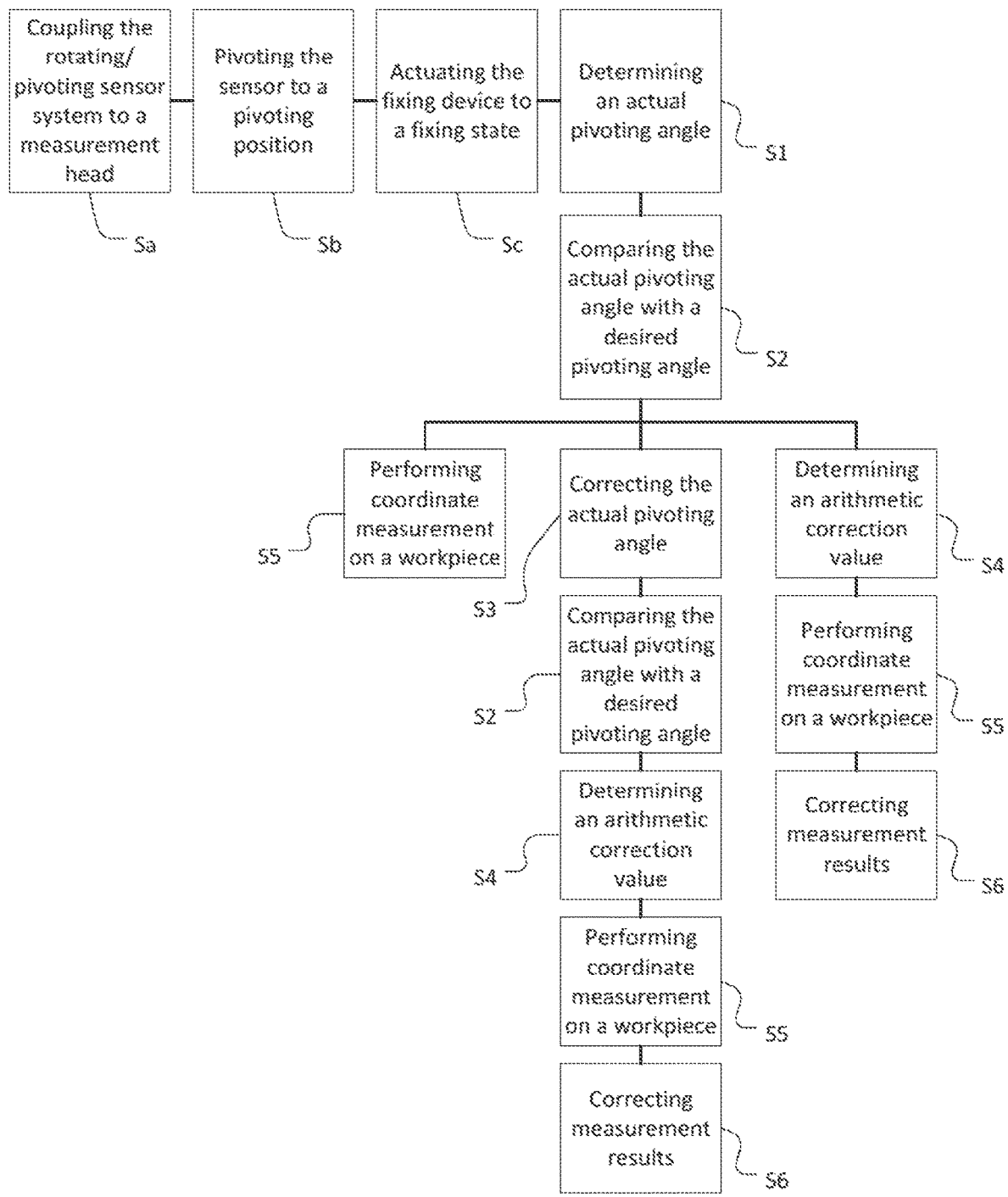
FIG. 3 shows a flowchart of a method according to an exemplary embodiment of the invention.

FIG. 3 schematically illustrates a method according to an exemplary embodiment of the invention.

The method according to the exemplary embodiment of the invention can entail the rotating/pivoting sensor system 1 being coupled to the measurement head 32 (see FIG. 2B). Thereafter, in accordance with the set-up in FIG. 2B, the sensor 10 is brought to a desired pivoting position. For example, from the position shown in FIG. 2B, it can be rotated perpendicularly downwards into a horizontal position such that the shaft 12 is perpendicular to the rotation axes D1 and D2. The fixing device 18, as described with reference to FIG. 1, is then actuated, and the sensor 10 is fixed in this pivoting position. In FIG. 3, the coupling step is designated as Sa, the pivoting step is designated as Sb, and the step of actuating the fixing device is designated as step Sc. Alternatively, instead of taking place before the step S1 explained below, step Sc can also take place after the step S3 explained below.

Then, in step S1, an actual pivoting angle is determined by the angle-measuring system 17, wherein the fixing device 18 may be actuated, i.e., the pivoting position of the shaft 12 may be fixed, or may not be actuated. The absolute angle is determined by the angle-measuring system 17 relative to a zero point.

Then, in step S2, a comparison is made with a desired pivoting angle, which is generally a predefined pivoting angle. If the comparison reveals a deviation between the actual pivoting angle and the desired pivoting angle, a correction is performed in step S3 in order to adjust the actual pivoting angle to the desired pivoting angle or to bring it substantially close to the latter. Instead of actually changing the pivoting angle, it is possible, in the case of a minimal deviation, to determine an arithmetic correction value in a step S4, for example, if the deviation between the actual pivoting angle and the desired pivoting angle is so small that this error cannot be eliminated by an adjustment or is merely accentuated by an adjustment. This variant is shown on the far right in FIG. 3.

After the step of actually modifying the actual pivoting angle in step S3, a comparison with the desired angle can also take place again as per step S2, after which an arithmetic correction value can be determined in step S4. For example, after a correction in step S3, the fixing device is brought to the fixing position. In doing so, a minimal angle adjustment can be performed by mechanical action, between the disc 21 and the cheeks 22, 23 in FIG. 1. This minimal deviation between the actual pivoting angle and the desired pivoting angle cannot be corrected by again releasing the fixing device 18, rotating the shaft 12, and again fixing the fixing device 18 since, when the fixing device 18 is once again fixed, a deviation is again generated between the actual pivoting angle and the desired pivoting angle. Thus, after a further step S2, an arithmetic correction value is determined in a step S4. This method variant is shown in FIG. 3 middle branch of the flowchart of the method.

The left-hand branch of the flowchart of the method shown in FIG. 3 shows the somewhat rare case in which there is no deviation at all between the actual pivoting angle and the desired pivoting angle. In this case, a coordinate measurement on a workpiece can be carried out immediately in step S5. Otherwise, the coordinate measurement S5 is carried out after the arithmetic correction value is determined in step S4. Alternatively, step S5 could also be performed directly after step S3 if one wanted to carry out a measurement without correcting the remaining deviation between the actual pivoting angle and the desired pivoting angle. In step S6, measurement results from the coordinate measurement on a workpiece are corrected with the aid of the arithmetic correction value that was determined in step S4.

It is understood that the foregoing description is that of the exemplary embodiments of the invention and that various changes and modifications may be made thereto without departing from the spirit and scope of the invention as defined in the appended claims.

LIST OF REFERENCE SIGNS 1 rotating/pivoting sensor system
2 coupling mechanism
3 plate
4 rollers
5 sensor-holding part
6 housing
7, 8 roller bearings
9 axle
10 sensor
11 connection piece
12 shaft
13 motor
14 motor axle
15 toothed wheel
16 toothed wheel
17 angle-measuring system
18 fixing device
19, 20 levers
21 disc
22, 23 cheeks
24 rotation axis
25 motor
26 motor axle
27 pinion
28 eccentric toothed wheel
29 probe sphere
31 mating coupling mechanism
32 measurement head
D1, D2 rotation axes
Sa step of coupling the fixing device
Sb step of pivoting the fixing device
Sc step of actuating the fixing device
S1 step of determining an actual pivoting angle
S2 step of comparison with a desired pivoting angle
S3 step of correcting the actual pivoting angle
S4 step of determining an arithmetic correction value
S5 step of coordinate measurement on a workpiece
S6 step of correcting measurement results from the coordinate measurement

What is claimed is:

1. A rotating/pivoting sensor system for a coordinate measuring apparatus, the system comprising:
a coupling mechanism configured to couple the rotating/pivoting sensor system to a measurement head of the coordinate measuring apparatus;
a sensor-holding part connected directly or indirectly to the coupling mechanism;
a sensor mounted rotatably about a first rotation axis on the sensor-holding part and being pivotable about the first rotation axis in a continuous angle range;
an angle-measuring system configured to determine a pivoting angle of the sensor; and
a fixing device configured to fix the sensor in a pivoting position.

2. The rotating/pivoting sensor system of claim 1, wherein the fixing device provides a force-fit connection in a fixing state.

3. The rotating/pivoting sensor system of claim 1, wherein the fixing device has friction surfaces which are pressable against each other in a fixing state.

4. The rotating/pivoting sensor system of claim 2, wherein the fixing device has friction surfaces which are pressable against each other in the fixing state.

5. The rotating/pivoting sensor system of claim 1, wherein the fixing device provides a form-fit connection in a fixing state.

6. The rotating/pivoting sensor system of claim 5, wherein the fixing device has a toothing arrangement with teeth meshing in one another.

7. The rotating/pivoting sensor system of claim 1, further comprising a motor configured to bring the fixing device to a fixing state.

8. The rotating/pivoting sensor system of claim 1, further comprising a motor configured to release the fixing device.

9. The rotating/pivoting sensor system of claim 1, wherein the fixing device includes a magnetically acting brake.

10. The rotating/pivoting sensor system of claim 1, wherein the fixing device is a magnetically acting brake.

11. A method for adjusting a rotating/pivoting sensor system in a coordinate measuring apparatus, the method comprising:
coupling the rotating/pivoting sensor system of claim 1 to a measurement head of the coordinate measuring apparatus;
pivoting the sensor to the pivoting position;
actuating the fixing device to the fixing state; and
fixing the sensor in the pivoting position.

12. The method of claim 11, further comprising:
determining an actual pivoting angle with the angle-measuring system before and after the actuating of the fixing device;
comparing the actual pivoting angle with a desired pivoting angle; and
correcting the actual pivoting angle if the comparing reveals a deviation of the actual pivoting angle from the desired pivoting angle, wherein the deviation is eliminated or substantially eliminated by modifying the actual pivoting angle when the actual pivoting angle is corrected.

13. The method of claim 12, further comprising:
determining an arithmetic correction value if the comparing reveals the deviation of the actual pivoting angle from the desired pivoting angle.

14. The method of claim 11, further comprising:
determining an actual pivoting angle with the angle-measuring system after the actuating of the fixing device;
comparing the actual pivoting angle with a desired pivoting angle; and
determining an arithmetic correction value if the comparing reveals a deviation of the actual pivoting angle from the desired pivoting angle.

15. The method of claim 13, further comprising:
performing a coordinate measurement on a workpiece; and
correcting measurement results obtained from the coordinate measurement by using the arithmetic correction value.

16. The method of claim 14, further comprising:
performing a coordinate measurement on a workpiece; and
correcting measurement results obtained from the coordinate measurement by using the arithmetic correction value.

* * * * *